THOMAS & MAST.
Seed Planter.
No. 55,742.
Patented June 19, 1866.
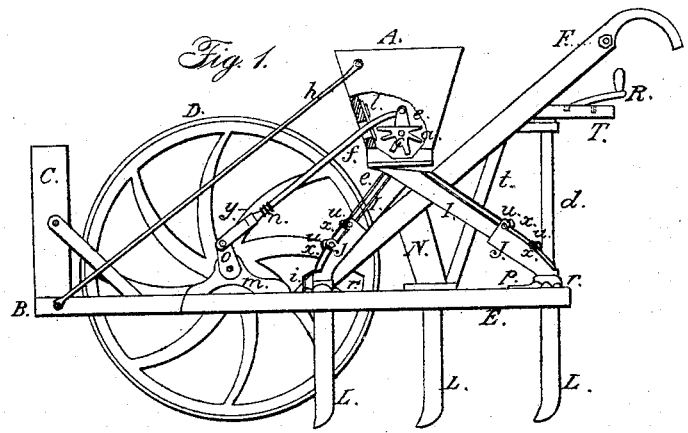
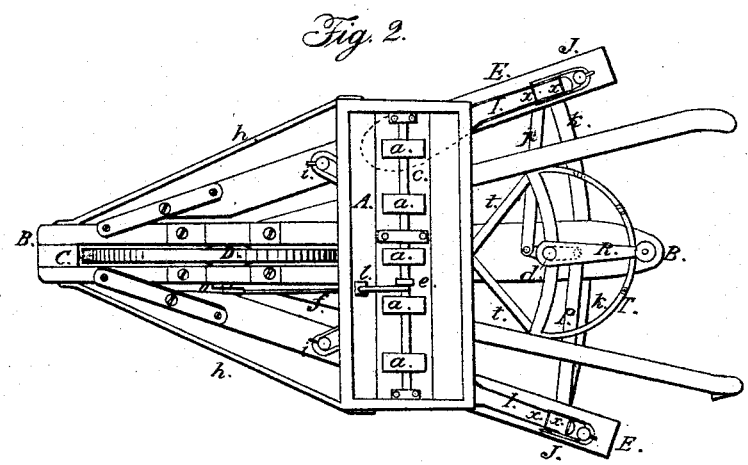
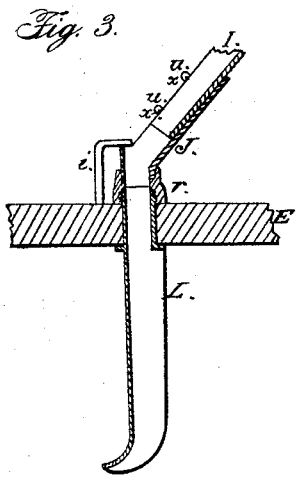
Witnesses:
P. T. Dodge
Jno. D. Patten
Inventor:
J. L. Thomas &
P. P. Mast
By W. C. Dodge

UNITED STATES PATENT OFFICE.

J. H. THOMAS AND P. P. MAST, OF SPRINGFIELD, OHIO.

IMPROVEMENT IN GRAIN-DRILLS.

Specification forming part of Letters Patent No. 55,742, dated June 19, 1866.

*To all whom it may concern:*

Be it known that we, J. H. THOMAS and P. P. MAST, of Springfield, in the county of Clarke and State of Ohio, have invented certain new and useful Improvements in Grain-Drills; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, we will proceed to describe it.

Our invention relates to grain-drills intended to be used for drilling small grains on corn-stubble or among standing corn and for similar purposes; and our invention consists in a novel construction and arrangement of the parts by which the drill may be expanded or contracted at will without removing or detaching any of its parts, and in various devices to enable it to be thus used.

Figure 1 is a side elevation; Fig. 2, a top-plan view, and Fig. 3 a section of a portion detached.

B represents the main portion of the frame, and consists of a single straight bar slotted at its front portion to receive a wheel, D, upon which the front portion of the machine is supported, and from which motion is imparted to the seeding devices, as hereinafter explained.

An additional bar or ring, E, is pivoted or hinged on each side, near the front end of bar B, as shown in Fig. 2, the rear end of these bars E being connected by rods $p$ to arms secured to the bottom of the vertical rod $d$, the upper end of said rod $d$ being provided with a crank or handle, R, by turning which the bar E may be spread asunder or drawn together, as desired, a circular rack, T, provided with notches, as shown, serving to hold the lever R, and consequently the bars E, in any desired position.

A represents the hopper for containing the grain to be sown. This hopper is supported upon the tube N, which is securely bolted at its lower flanged end to the central beam, B, of the frame, the hopper being further secured and held in position by the brace-rods $p$, as shown in Figs. 1 and 2. Within the hopper a shaft, $c$, is mounted, having an arm, $e$, attached thereto, as shown in Fig. 1, and a rod, $f$, serves to connect this arm $e$ with a crank, $o$, attached to the axle of the wheel D, by which means an oscillating motion is imparted to the shaft $c$ whenever the machine is in motion.

Suitable holes are made in the bottom of the hopper for the escape of the seed, the flow of which is regulated by a slide, as in the machine heretofore patented to us.

In order to prevent the seed from becoming clogged in the openings, we attach to the shaft $c$, over each of the holes, a stirrer, $a$, which has radial projections somewhat like cogs on about one-half of its periphery, as shown in Fig. 1, the to-and-fro motion of which keeps the grain thoroughly stirred up and feeds it through the openings into the tubes I.

It will be observed that the rod $f$ passes through an opening in the front side of the hopper A, and as the rod $f$ has an up-and-down movement, caused by the rotation of the crank $o$ and the oscillation of the arm $e$, the hole through which it enters the hoppers has necessarily to be enlarged. In order to prevent the escape of the grain at this opening and still allow free play to the rod $f$, a plate, $l$, is slipped onto the rod $f$, and is then attached to the inside of the hopper in such a manner as to permit it to slide up and down with the rod $f$, and thus, while preventing the escape of the grain, allow the rod to move freely. The lower end of the rod $f$ has a screw-thread cut on it, which fits into the sleeve Y, by which means it may be adjusted as desired, a jam-nut, $n$, serving to hold it secure when once adjusted.

In order to permit the expanding or contracting of the drill without detaching the tubes I, they are made much wider at their upper end, and are pivoted to the under side of the hopper on the opposite side of the hole, as shown at $e'$ of Fig. 1. By this means they may be moved to either side as much as may be necessary, their upper and wider ends still covering the openings in the hopper-bottom and receiving the grain therefrom at all times. In order to still further accommodate these tubes to the adjustments of the bars E, they are constructed of two parts, the upper portion, I, having its lower end fitted within the lower portion, J, and held therein by pins $x$, passing through the ears $u$, as shown more clearly in section in Fig. 3, the parts being fitted loosely, so as to slide upon each other like the case of a telescope, whereby their length is adjusted automatically by the movements of the bars E. These tubes may obviously be made round; but it is preferred to have them open on their upper portion, as the operator is thus enabled at all times to see whether or not the grain is flowing properly in them all.

L represents the drill-tubes or shares. They are tubular in form, open on their rear side, and are attached to the beams B and E by means of a tubular nut, $r$, screwed onto their upper ends, above the beams, as shown. The lower end of the tubes J are fitted into the upper portion of these nuts $r$ loosely, so as to turn freely therein, and are held there by the bent pins $i$, which fit over the shoulder at the lower portion of J, as shown, and thus prevent the tubes from becoming displaced.

In order to bring the body of the machine near the ground, and thus obviate the necessity of making the shares L of too great length, or of using drag-bars, and at the same time allow the use of a proper-sized wheel, the wheel D is attached to the bar B by means of the brackets $m$, which bring the bars of the frame below the axle of the wheel, as shown in Fig. 1. An upright, C, is attached to the front end of bar B, and is securely braced, as shown, to afford a means of attaching the whiffletree sufficiently high to prevent raising the front of the machine from the ground, in which case the wheel D would cease to rotate, and thereby prevent the machine from operating.

By this method of constructing the drill we are enabled to provide a machine that is specially adapted for use between rows of corn-stalks, nursery-trees, and in all similar places or conditions, and that can be adjusted as may be desired without loss of time or detaching any of its parts.

Having thus described our invention, what we claim is—

1. The hopper A, attached to the central or stationary bar, B, in combination with the adjustable bar E, substantially as shown and described.

2. The adjustable tubes I and J, arranged to operate in combination with the stationary hopper, and adjustable bars, substantially as and for the purpose set forth.

3. The slide $l$, when arranged to operate in combination with the rod $f$ and hopper A, as herein described.

4. The agitators $a$, having a to-and-fro movement over the openings of the hopper A, as shown and described.

5. The tube I, having its upper end enlarged, and so connected to the hopper A as to cover the opening therein and receive the seed therefrom at all adjustments of which the bars E are capable.

6. Pivoting the tube I to the hopper A and the tube J to the bar E, and having the tubes I and J arranged to slide upon each other, substantially as shown and described.

J. H. THOMAS.
P. P. MAST.

Attest:
  Jos. W. Thomas,
  W. C. Downey.